May 26, 1964 K. SCHLÖR 3,134,370
ROTARY MECHANISM HAVING BEARING COOLING MEANS
Filed March 7, 1962 2 Sheets-Sheet 1
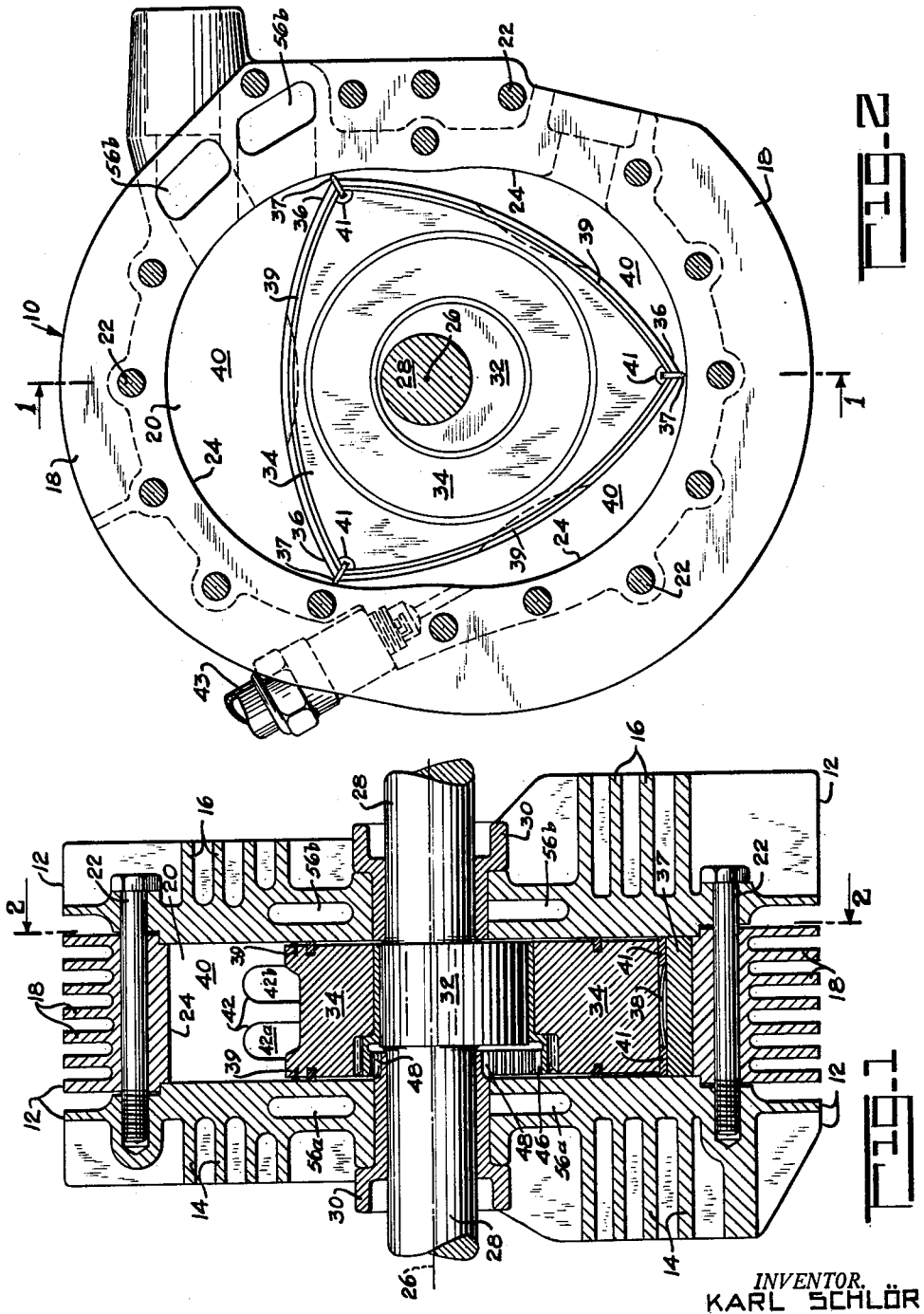
INVENTOR.
KARL SCHLÖR
BY
Thomas W. Kennedy
ATTORNEY

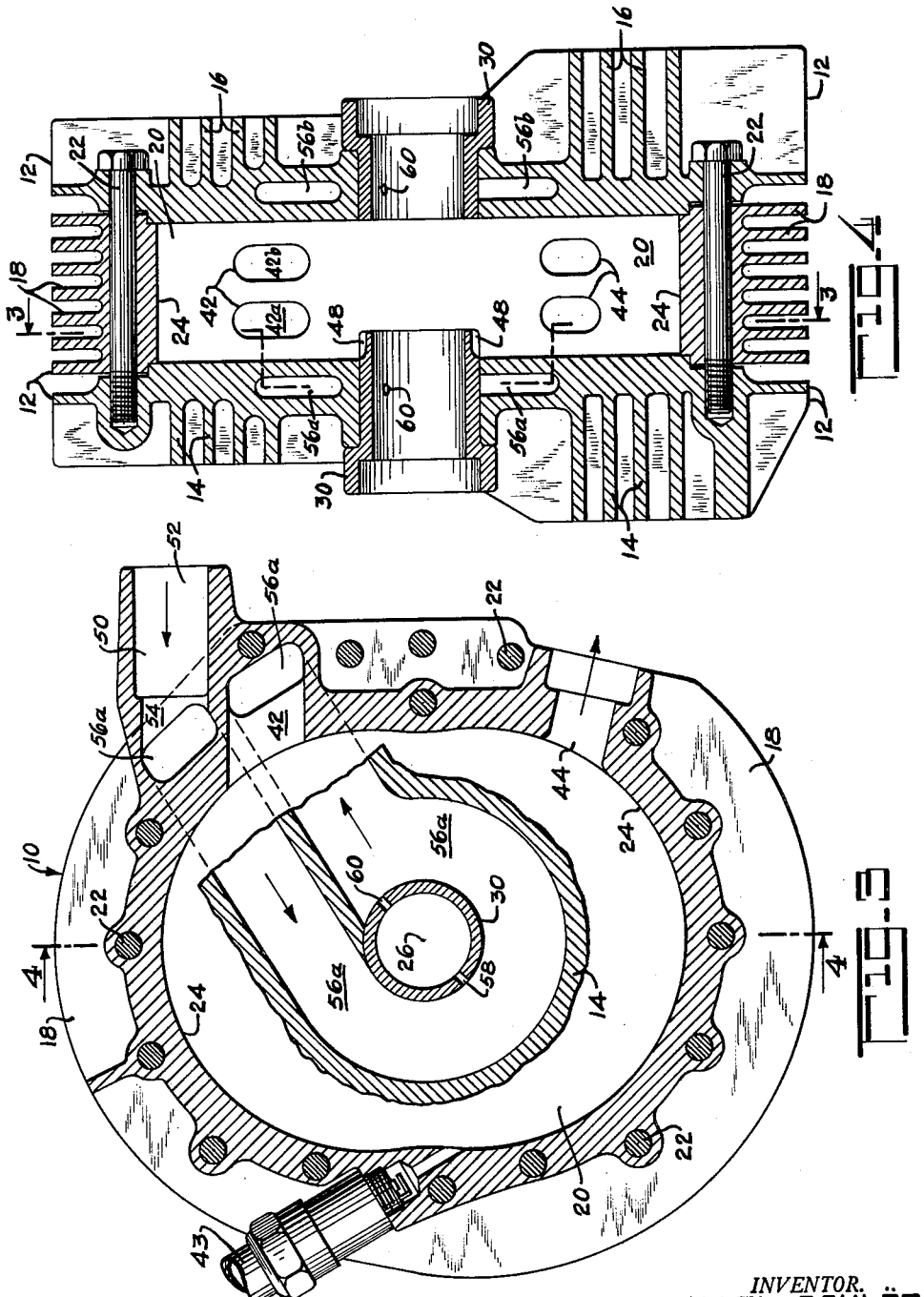

United States Patent Office 3,134,370
Patented May 26, 1964

3,134,370
ROTARY MECHANISM HAVING BEARING
COOLING MEANS
Karl Schlör, Lochham, near Munich, Germany, assignor to NSU Motorenwerke Aktiengesellschaft, Neckarsulm, Germany, and Wankel G.m.b.H., Lindau (Bodensee), Germany
Filed Mar. 7, 1962, Ser. No. 178,194
Claims priority, application Germany Mar. 8, 1961
4 Claims. (Cl. 123—8)

The present invention relates broadly to the art of rotary mechanisms, and is particularly directed to bearing cooling means for such rotary mechanisms.

The invention is particularly useful in connection with rotary mechanisms similar to that disclosed in U.S. Patent No. 2,988,065, although as will become apparent this invention is not limited to this specific type of rotary mechanism.

A rotary mechanism as disclosed in said patent comprises an outer body having a cavity therein and an inner body disposed therein rotatable relative to the outer body, about an axis laterally spaced from but parallel to the axis of said cavity. The inner body is journaled on an eccentric portion of a shaft which is co-axial with this outer body and journaled in bearings carried by this outer body end walls. The outer body has axially-spaced end walls and peripheral wall interconnecting the end walls to form said cavity; the inner surface of the cavity peripheral wall having a multi-lobe profile which preferably is basically an epitrochoid. The inner body has end faces disposed adjacent to said outer body end walls for sealing cooperation therewith and has a peripheral surface with a plurality of circumferentially-spaced apex portions, each carrying a radially-movable seal for sealing engagement with the multi-lobe inner surface of the outer body peripheral wall to form a plurality of working chambers between the two bodies which vary in volume upon relative rotation of the two bodies.

The inner body or rotor of a rotary combustion engine is subjected to very high thermal stresses, and the removal of heat from the rotor is a major difficulty with such engines. The use of a cooling medium circulated through the rotor to remove the heat is a known method of cooling the rotor. But the devices and means to circulate a fluid to and from the rotor complicate the engine design. When a cooling medium is not circulated through the rotor, the rotor must dissipate most of its heat through the end faces of the rotor into the end walls of the housing or outer body. This creates a danger that the rotor shaft bearings may become overheated and impaired.

An object of the present invention comprises the provision of a rotary combustion engine in which a novel arrangement utilizing the engine intake charge is provided for cooling the engine bearings.

Specifically, the invention comprises the provision of an intake passage for the engine intake charge such that instead of said passage extending directly through the outer body to the engine intake port opening, it first passes through the two end walls of the outer body and around the bearing carried by each end wall for the engine shaft and then finally to the engine intake port opening. With this arrangement the incoming charge serves to cool said shaft bearings. This cooling of the region or area around the bearing in the end wall is principally accomplished due to the relatively cool intake air. In the case of an engine with a fuel-air mixture, there is an additional cooling action through the vaporization of the fuel which is present in a finely dispersed state in the inducted air.

This invention also provides by-passing conduits to transfer lubricant to bearings from the intake passage, when the intake charge contains a lubricating medium. For this purpose, particularly when sleeve-type bearings are used, conduits or holes may be provided within the end walls connecting the intake passage to the bearings within which the rotor shaft is journaled. These bearing holes are preferably so arranged that a pressure difference of the intake charge exists across certain of the holes. This ensures a reliable supply of the lubricating medium to the bearing, even counter to the local over-pressure forming, for example due to the centrifugal effects resulting from the rotation of the engine shaft while the engine is operating.

An additional object is to combine a rotor-bearing bushing with the intake passage so that at least a portion of the bushing forms a wall of the passage whereby the bushing is exposed to direct flow of the intake charge thereover.

It is an additional object to provide holes or conduits connecting the intake passage with the bearing interior to carry lubricant to the bearing from the fluid mixture in the intake passage, when the fluid mixture contains a lubricating medium.

Other objects of the invention will become apparent upon reading the annexed detail description in connection with the drawing in which:

FIGURE 1 is a longitudinal sectional view taken along line 1—1 of FIGURE 2 and showing a rotary combustion engine embodying this invention.

FIGURE 2 is an end elevation view of a rotary combustion engine, but leaving off the end wall, taken along line 2—2 of FIGURE 1.

FIGURE 3 is a cross-section view, with the inner body and shaft removed, taken along line 3—3 in FIGURE 4.

FIGURE 4 is a longitudinal sectional view taken along line 4—4 of FIGURE 3.

Referring to the drawings, a rotary combustion engine 10 is illustrated as comprising an outer body 12 having spaced end walls 14 and 16 and a peripheral wall 18 disposed between and interconnecting said end walls to form a cavity 20 therebetween. Screws 22 are provided for connecting the walls 14, 16 and 18 together. The inner surface 24 of the peripheral wall 18 has a multi-lobe profile which is basically an epitrochoid having an axis 26 along which the end walls 14 and 16 are spaced.

A shaft 28, co-axial with the axis 26, extends through the outer body and is journaled in bearings 30 carried by the end walls 14 and 16. The shaft 28 has an eccentric portion 32 on which an inner body 34 is journaled. The inner body has a plurality of apex portions 36 having seal means 37 urged radially outward by spring means 38 into sealing engagement with the peripheral wall inner surface 24, and also side seal means 39 and intermediate seal means 41 disposed in sealing engagement with the end walls 14 and 16, to form a plurality of working chambers 40 which vary in volume upon relative rotation between the outer and inner bodies 12 and 34.

The outer body has intake port means 42 for supply of an intake charge to the working chambers 40 and has exhaust port means 44 for discharge of exhaust gases from the engine. If needed, a suitable spark plug 43 may be provided to ignite the intake charge.

In order to maintain the relative motion of the inner body 34 relative to the stationary outer body an internal gear 46 is, as illustrated, secured to the inner body co-axially with the inner body axis and is disposed in mesh with a fixed gear 48 secured to the outer body by means not shown, said fixed gear being co-axial with the shaft 28.

The engine so far described is substantially similar to the engine disclosed in the aforementioned patent and reference is made to said patent for a more detailed description of said engine.

An intake passage 50 is provided for supplying the intake charge to the intake port 42. However instead of running directly through the peripheral wall 18 from its supply opening 52, in accordance with the present invention the intake passage 50 has portions in each end wall 14 and 16 and encircling the shaft bearing 30 carried by each said end wall. For this purpose the intake passage 50 divides at 54 in the peripheral wall 18 into two branches 56a and 56b which extend in opposite directions parallel to the engine axis to and into the end walls 14 and 16. In the end wall 14 the intake passage portion 56a encircles the shaft bearing 30 carried by said end wall 14. Similarly, in the end wall 16 the intake passage portion 56b encircles the shaft bearing 30 carried by the end wall 16. After encircling their bearings 30 the two intake passage portions 56a and 56b then run axially toward each other into the peripheral wall 18 and terminate at the intake port 42. Preferably, as illustrated, the intake port 42 consists of two halves 42a and 42b disposed in side-by-side relation, one for each of the passages 56a and 56b respectively. Thus, the intake port half 42a is disposed adjacent to the end wall 14 and is connected to the intake passage portion 56a while the intake port half 42b is disposed adjacent to the end wall 16 and is connected to the intake passage portion 56b.

As illustrated, each intake passage portion 56a and 56b preferable is formed so that its associated shaft bearing 30 forms at last a portion of the inner wall of the passage portion around the bearing. In this way, each bearing 30 is directly exposed to flow of the relatively cool intake charge over the bearing for maximum cooling effectiveness.

If the intake charge supplied to the engine 10 contains a lubricating medium, it may be desirable to use some of this lubricating medium for lubricating the bearings 30. For this purpose, where the bearings 30 are plain sleeve-type bearings, as illustrated, each bearing sleeve is provided with a plurality of holes, preferably at least two, 58 and 60 as shown in FIGURE 3. The holes 58 and 60 in a bearing 30 are disposed so as to communicate with the associated intake passage portion 56a and 56b at spaced points, such that an intake charge pressure differential exists thereacross, to produce flow of a small amount of intake charge with its lubricating medium therethru. As illustrated in FIGURE 3, the pressure in the intake passage portion 56a at the hole 58 would be somewhat greater than the pressure at the hole 60.

While I have described my invention in detail in its present preferred embodiment it will be obvious to those skilled in the art after understanding my invention that various changes and modifications may be made therein without departing from the spirit or scope thereof.

What is claimed is:

1. A rotary combustion engine comprising an outer body having spaced end walls and a peripheral wall forming a cavity therebetween having an axis along which said end walls are spaced; a shaft co-axial with said cavity and extending therethru; bearing means carried by each end wall for supporting said shaft; an inner body on said shaft and disposed within said cavity for rotation relative to the outer body, said inner body having a plurality of circumferentially-spaced apex portions disposed in sealing cooperation with the inner surface of said peripheral wall to form a plurality of working chambers between said bodies which vary in volume upon relative rotation of said bodies, said outer body having an exhaust port and an intake port opening into said cavity for communication with said chambers; and intake passage means in said outer body communicating with said intake port, said intake passage means including a portion in each end wall and encircling the shaft bearing means carried by said end wall for flow of the intake charge therethru to cool said bearing means.

2. A rotary combustion engine as claimed in claim 1 and in which said intake port consists of two side-by-side openings in the inner surface of the peripheral wall with the one opening communicating with the intake passage portion in one end wall and with the other opening communicating with the intake passage portion in the other end wall.

3. A rotary combustion engine as claimed in claim 1 and in which the shaft bearing means carried by at least one of said end walls is a sleeve-type bearing having openings therethru communicating with the surrounding intake passage portion for lubrication of said bearing by a lubrication medium carried by the intake charge.

4. A rotary combustion engine as claimed in claim 3 and in which at least two lubrication openings are disposed in said sleeve-type bearing so that there is an intake charge pressure difference across the openings.

References Cited in the file of this patent

UNITED STATES PATENTS 2,737,161     Gaskill _____ Mar. 6, 1956
3,042,009     Froede et al. _____ July 3, 1962